3,822,316
PROCESS FOR PREPARING α-METHYLACROLEIN

Helmut Reiff, Cologne, and Dieter Dieterich, Leverkusen, Germany, assignors to Bayer Aktiengesellschaft, Leverkusen, Germany
No Drawing. Filed May 5, 1972, Ser. No. 250,532
Claims priority, application Germany, May 12, 1971, P 21 23 451.5
Int. Cl. C07c 47/20
U.S. Cl. 260—603 R  11 Claims

ABSTRACT OF THE DISCLOSURE

α-Methylacrolein is prepared by reacting 2-methylene-1,3-propane diol with a strong acid at a temperature of from 80° to 220° C.

BACKGROUND

This invention relates to a new process for the production of α-methylacrolein.

Several processes are known for producing α-methylacrolein including, for example, the oxidation of isobutylene in air or the decomposition of the Mannich base of propionaldehyde, formaldehyde and dimethylamine. None of the processes described in the literature, however, has ever acquired any appreciable technical significance.

SUMMARY

Surprisingly, it has now been found that α-methylacrolein can be obtained in substantially quantitative yields by heating 2-methylene - 1,3 - propane diol with solutions of strong acids containing from 2 to 90% by weight and preferably from 10 to 25% by weight of acid, to temperatures of from 80° C. to 220° C. and preferably to temperatures of from 90° to 130° C.

DESCRIPTION

Strong acids which are suitable for the process according to the invention are those which have a pK-value of less than 3 (for a definition of the pK-value, see G. Kortum, Lehrbuch der Elektrochemie, Wiesbaden, pages 297, 307). Examples of such acids include the strong inorganic acids such as hydrohalic acids, sulphuric acid, phosphoric acid, nitric acid and perchloric acid; carboxylic acids such as mono-, di- and tri-chloroacetic acid, chloromalonic acid and o-chlorobenzoic acid; and sulphonic acids such as benzene sulphonic acid.

Acids with a pK-value of less than 2 are preferred. Acids which are not volatile in steam and which are easy to obtain are most useful.

Acids which meet these requirements include in particular the inorganic acids, and sulphuric acid, perchloric acid, orthophosphoric acid, concentrated hydrochloric acid and hydrobromic acid are preferred.

Although water is preferably used as the solvent, other solvents or mixtures of one or more of these with water may also be used. Suitable solvents include alcohols, especially alkanols, which preferably contain from 1 to 5 carbon atoms.

The reaction can be carried out either continuously or in batches.

The molar ratio of acid to 2-methylene-1,3-propane diol is not critical and can be varied within wide limits. For example, the reaction can be carried out with only 0.05 mol percent of acid, or with as much as 500 mol percent of acid, based on the 2-methylene-1,3-propane diol. Depending upon the type of acid used and upon the quantity of solvent used, upper limits are imposed either by the solubility limit of the acid used or by the need to prevent secondary reactions attributable to the chemical nature of the acid becoming important, e.g. oxidations. In addition, the molar ratio can or will change during the reaction depending upon how the process is carried out, for example through the decrease in the concentration of 2-methylene-1,3-propane diol caused by the reaction or through removal of the solvent by evaporation or distillation. It is expedient for reasons connected with, for example, reaction velocity, process conditions, type of acid used or costs, to select a relatively narrow range for the molar ratio which prevails initially, for example from 0.05 to 60 and preferably from 30 to 50 mol percent of acid, based on the 2-methylene-1,3-propane diol.

The process according to the invention can be carried out in several different ways:

For example, a mixture of 2-methylene-1,3-propane diol and dilute aqueous acid may be introduced into a distillation apparatus, heated to the boiling point, and distilled for as long as fractions continue to distil over below 105–110° C. In the receiver, the distillate will separate into an organic phase and an aqueous phase. The solubility of the α-methylacrolein in the aqueous phase may be reduced and the yield of organic phase increased by salting out with, for example, sodium chloride. The organic phase may then be separated off and dried. The α-methylacrolein can thus be obtained in high yields in a highly pure form.

Instead of salting out, any other suitable method for the recovery of the α-methylacrolein left in the aqueous phase may be adopted.

The reaction can also be carried out in batches for example by heating an aqueous solution of the acid to approximately 100° C. and then introducing a batch of 2-methylene-1,3-propane diol dropwise or at a low flow rate with an accompanying further heating to temperatures between 130° and 140° C. by external heating. Aqueous α-methylacrolein as being formed is then distilled off overhead in a distillation column at a head temperature of from 80 to 100° C., being furthermore isolated as described above by salting out the aqueous phase, separating off and drying the organic phase.

The batch reaction can also be carried out by blowing steam into the boiling reaction mixture and hence continuously removing the formed product α-methylacrolein by steam distillation.

Although other solvents can be used, for example alcohols or mixtures thereof with water, their use does not, in general afford any advantages.

The process according to the invention can be carried out at a wide range of temperatures. This range is limited at the lower end by the decrease in reaction velocity, so that a temperature of below about 80° C. is not normally useful. Where the reaction is carried out under normal pressure, the temperature range is limited at its upper end by the boiling temperature of the reaction mixture corresponding to the particular composition.

Although there is no need to work at elevated pressures, it can be advantageous, especially where the process is carried out continuously, to work at elevated pressures. In such cases, correspondingly higher reaction temperatures and boiling temperatures will be appropriate for the liquid reaction mixture, being determined in the known manner by the freely selected parameters. The internal temperature of the reaction zone can even be increased beyond this so determined level by suitable external heating, especially in cases where the process is carried out continuously, although it is not advisable to exceed an upper limit of about 220° C.

Where the process is carried out continuously, the following procedure can, for example, be adopted:

The concentration of 2-methyl-1,3-propane diol is maintained constant by its continuous introduction at a rate corresponding to its rate of consumption, as can be readily determined by conventional methods of analysis (for example gas chromatography). The α-methylacrolein formed is removed continuously from the reaction zone by steam distillation. The water content of the reaction mixture is maintained constant by the simultaneous introduction of water and/or steam at a rate corresponding to its rate of removal. Losses of acid, if any, can be continuously corrected in a similar way. The water and acid content of the reaction mixture can be checked, if necessary continuously, by the known methods of analysis (for example Karl-Fischer titration, pH measurement). A steam distillate is obtained and this can be worked up either continuously or in batches by separation of the organic phase as described above.

The aqueous phase is, however, preferably recycled, thus dispensing with the need to isolate the α-methylacrolein which remains dissolved in it. In such cases, there is no need to add water except to replace small quantities which are removed from the circuit with the organic phase separated off from the distillate.

The process according to the invention is not limited to a reaction carried out in homogeneous liquid phase, but may be carried out in a heterogeneous liquid phase system or even in heterogeneous system of liquid and vapour phases, for example at the phase boundary between gas (vapour) and liquid phase under suitable reaction conditions. For example, a temperature of from 80° C. to 220° C., more particularly from 110° C. to 160° C., may be maintained in a reaction tube into which 2-methylene-1,3-propane diol and the aqueous acid solution are introduced, optionally after previous mixing. The aqueous phase may be evaporated in an evaporator before introduction.

The aqueous phase remaining after the α-methylacrolein has been separated off is preferably recycled and water and acid added to it in such quantities that any losses are compensated and the consumption of water and acid kept within narrow limits.

α-Methylacrolein is obtained in a highly pure form and in high yields by the process according to the invention. The product obtained can generally be used directly. After one distillation the product is pure according to gas chromatographic analysis.

The α-methylacrolein can also be reacted further *in situ*, for example with the formation of a hydrazone derivative, by addition of the appropriate reagent, such as 2,4-dinitrophenyl hydrazine, to the reaction mixture.

It is not necessary to use pure 2-methylene-1,3-propane diol for the process according to the invention. Impure 2-methylenene-1,3-propane diol may also be used, such as that which accumulates during the hydrolysis of 2-methylene-1,3-propane diol diacetate and still contains relatively small quantities of alkali, starting material, acetic acid and/or water, or a 2-methylene-1,3-propane diol which has been obtained by other methods, see U.S. Pat. No. 3,423,432 which is incorporated herein by reference.

α-Methylacrolein is an important organic intermediate, for example in the production of polymers via methylacrylic acid its esters, e.g. polymethylmethacrylates, lacquers and binders.

Furthermore α-methylacrolein is an important and most valuable intermediate in the synthesis of "Diels-Alder-Adducts." Such adducts are widely used for example as perfumes and anti-oxidizing agents. α-Methylacrolein can also be used for the synthesis of 3,5-dinicotinic acid via oxidation of 3,5-dimethylpyridine. The derivatives of dinicotinic acid, such as esters, amides, hydrazones are either useful in the synthesis of pharmaceutical compounds or they are pharmaceutical compounds already.

In the following Examples, the words "percent acid" refer to percent by weight in aqueous solution, unless otherwise stated.

EXAMPLE 1

500 ml. of 20% sulphuric acid (1 mol) are heated to 90–100° C. in a three-necked flask equipped with dropping funnel, stirring mechanism and distillation column. 176 g. (2 mols) of 2-methylene-1,3-propane diol are then added dropwise over a period of 30 to 60 minutes and the bath temperature is then increased to 130–140° C. over a period of 3 hours. Aqueous α-methylacrolein distils off in the column (boiling point 80–100° C.). After the aqueous phase has been salted out by addition of NaCl, the organic phase is separated off and dried over $Na_2SO_4$, to give 106 g. of α-methylacrolein (77% of the theoretical) with a purity of 96.5% (according to analysis by gas chromatography). The yield can be increased to 110 g. (80% of the theoretical) by extraction of the aqueous phase with a little cyclohexane.

EXAMPLE 2

The procedure followed in that described in Example 1, except that 450 ml. of 20% perchloric acid (0.9 mol) are used instead of the sulphuric acid. 130 g. of α-methylacrolein with a purity of 95.5% (according to gas chromatographic analysis) are obtained, corresponding to a yield of 88.5% of the theoretical.

EXAMPLE 3

490 g. of 20% perchloric acid (0.9 mol) and 264 g. of 2-methylene - 1,3 - propane diol (3 mols) are mixed together, heated to boiling point and steam passed into the mixture to effect a steam distillation. 177 g. of α-methylacrolein (84% of the theoretical) are obtained from 1.8 litres of distillate after it has been salted out, separated and the organic phase has been dried.

EXAMPLE 4

In an apparatus of the kind described in Example 1, 2-methylene-1,3-propane diol with a purity of 86% (2 mols) is mixed with 47 g. of 85% orthophosphoric acid (0.42 mol) and 47 g. of water. The resulting mixture is then heated to 110° C. and a total of 100 ml. of water added dropwise over a period of 4 hours at a rate corresponding to the rate at which aqueous α-methylacrolein distils off. The reaction mixture is then maintained at the same temperature for a further 2 hours.

130 g. of α-methylacrolein with a purity of 92.2% (according to gas chromatographic analysis) are obtained by separation of the organic phase and drying this over $Na_2SO_4$.

Extraction of the aqueous phase with 50 ml. of methylene chloride gives a further 17.3 g. of α-methylacrolein (according to gas chromatographic analysis) after drying of the organic phase over $Na_2SO_4$.

The total yield of α-methylacrolein is thus 98% of the theoretical.

EXAMPLE 5

The procedure described in Example 4 is repeated using 100 g. of 25% sulphuric acid (0.25 mol) in place of the 47 g. of 85% phosphoric acid. 135 g. of α-methylacrolein (86.5% of the theoretical) are obtained.

EXAMPLE 6

The procedure described in Example 5 is repeated using only 40 g. of 25% sulphuric acid (0.1 mol). 134 g. of α-methylacrolein (85.5% of the theoretical) are obtained.

EXAMPLE 7

88 g. of 2-methylene - 1,3 - propane diol (1 mol) are added dropwise over a period of 1 hour to 250 g. of 15% sulphuric acid (approximately 0.4 mol) over a heating bath at a temperature of 150–165° C., the internal temperature of the mixture of 97–103° C. The aqueous phase of the distillate obtained during the first hour is then reintroduced to the reaction mixture over a period of 1 hour.

A further 88 g. of 2-methylen-1,3-propane diol (1 mol) are added dropwise during a third hour, and the aqueous phase of the distillate obtained in the second and third hours is reintroduced over the period of a fourth hour.

The 2-hour cycle of the third and fourth hours is repeated three times during which time the head temperature of the column is between 95 and 105° C.

The yield obtained after these five 2-hour cycles comprises 296 g. of crude product with an α-methylacrolein content of 96% as determined by gas chromatography (84.5% of the theoretical).

The same result is obtained when the dropwise addition of 88 g. of 2-methylene-1,3-propane diol in each 2-hours-cycle is made in admixture with the aqueous phase of the distillate obtained in the preceding 2-hours cycle.

EXAMPLE 8

1.9 g. of 2-methylene-1,3-propane diol (approximately 0.02 mol) are added to a solution prepared from 5.5 g. of 2,4-dinitrophenyl hydrazine (approximately 0.03 mol), 15 ml. of concentrated hydrochloric acid (0.15 mol) and 200 ml. of ethyl alcohol and the mixture boiled under reflux for 1 hour. 4.5 g. of α-methylacrolein-2,4-dinitrophenyl hydrazone are obtained which melts at 201–202° C. (83.5% of the theoretical).

What is claimed is:

1. Process for preparing α-methylacrolein which comprises reacting 2-methylene-1,3-propane diol with a strong acid having a pK-value of less than 3 at a temperature of from 80° to 220° C., said 2-methylene-1,3-propane diol being introduced into the reaction continuously together with water and/or steam and the α-methylacrolein being continuously removed by distillation with steam.

2. Process of claim 1 wherein the acid content of the solution is from 2 to 90% by weight.

3. Process of claim 1 wherein the strong acid has a pK-value of less than 2.

4. Process of claim 3 wherein the strong acid is an inorganic acid.

5. Process of claim 1 wherein the strong acid is selected from the group consisting of sulphuric acid, perchloric acid, orthophosphoric acid, hydrochloric acid and hydrobromic acid.

6. Process of claim 1 wherein the acid is selected from the group consisting of sulphuric acid, perchloric acid and hydrochloric acid and the acid content of the solution is from 10 to 25% by weight.

7. Process of claim 1 wherein the 2-methylene-1,3-propane diol is a crude reaction product of which the 2-methylene-1,3-propane diol is the predominant constituent.

8. Process of claim 1 wherein the 2-methylene-1,3-propane diol is in the form of the crude product obtained by hydrolysis of 2-methylene-1,3-propane diol diacetate.

9. Process of claim 1 wherein the reaction temperature is from 90 to 140° C.

10. Process of claim 1 wherein the aqueous phase of the steam distillate is recycled into the reaction.

11. Process of claim 1 wherein the reaction temperature is from 110 to 160° C.

References Cited

UNITED STATES PATENTS

| | | | |
|---|---|---|---|
| 2,097,154 | 10/1937 | Groll et al. | 260—603 R |
| 3,423,432 | 1/1969 | Weiss et al. | 260—347.8 |

OTHER REFERENCES

Chemische Berichte, 91 (1958), pp. 938–943.
J. Am. Chem. Soc., 67 (1945), pp. 942–944.
J. Am. Chem. Soc., 77 (1955), pp 6382–6383.

LEON ZITVER, Primary Examiner

D. B. SPRINGER, Assistant Examiner

U.S. Cl. X.R.

260—89.5 A, 290 R, 295.5 R, 566 B; 424—266